United States Patent [19]

Smaalders et al.

[11] Patent Number: 5,790,865

[45] Date of Patent: Aug. 4, 1998

[54] METHOD AND APPARATUS FOR REORDERING COMPONENTS OF COMPUTER PROGRAMS

[75] Inventors: Bart Smaalders; Kevin J. Clarke, both of San Jose, Calif.

[73] Assignee: Sun Microsystems, Inc., Mountain View, Calif.

[21] Appl. No.: 953,056

[22] Filed: Oct. 17, 1997

Related U.S. Application Data

[63] Continuation of Ser. No. 504,091, Jul. 19, 1995, abandoned.

[51] Int. Cl.⁶ .................................................... G06F 9/45
[52] U.S. Cl. .................................................... 395/709
[58] Field of Search .................................. 395/205, 207, 395/209

[56] References Cited

U.S. PATENT DOCUMENTS

| | | | |
|---|---|---|---|
| 4,937,736 | 6/1990 | Chang et al. | 395/418 |
| 5,119,495 | 6/1992 | King | 395/709 |
| 5,212,794 | 5/1993 | Pettis et al. | 395/709 |
| 5,293,631 | 3/1994 | Rau et al. | 395/707 |
| 5,367,687 | 11/1994 | Tarsy et al. | 395/709 |
| 5,450,588 | 9/1995 | Hoxey | 395/709 |
| 5,457,799 | 10/1995 | Srivastava | 395/709 |
| 5,491,823 | 2/1996 | Ruttenberg | 395/709 |
| 5,557,761 | 9/1996 | Chan et al. | 395/709 |

*Primary Examiner*—Emanuel Todd Voeltz
*Assistant Examiner*—Peter J. Corcoran, III
*Attorney, Agent, or Firm*—Blakely Sokoloff Taylor & Zafman

[57] ABSTRACT

A method and system for reordering sections of a computer program are disclosed. The computer program is executed during an experimental execution period. During the execution period, an access record is made. The access record identifies when each section of the computer program is accessed. After the execution period, the sections are reordered based on when the sections were accessed during the execution period. The sections may be code sections, data sections, or a sections that contain a combinatin of code and data (e.g. objects). According to one disclosed technique, the execution period is divided into time intervals. Each time interval corresponds to the time period in which a discrete high level operation of the computer program was performed. A data matrix is created where each row corresponds to a section, and each column corresponds to a time interval. Values are stored in each cell of the data matrix based on whether the corresponding section was accessed during the corresponding time interval. The sections are then reordered based on the values in the rows to which they correspond.

31 Claims, 6 Drawing Sheets

METHOD AND APPARATUS FOR REORDERING COMPONENTS OF COMPUTER PROGRAMS

This is a continuation of application Ser. No. 08/504,091 filed Jul. 19, 1995 now abandoned.

FIELD OF THE INVENTION

The present invention relates to software development, and more specifically, to a method and apparatus for ordering code sections of a computer program for efficient execution in a virtual memory environment.

BACKGROUND OF THE INVENTION

Numerous types of computer programs exist, including application programs, device drivers, libraries, etc. For the purposes of discussion, all such types of computer programs shall be referred to herein by the general term "computer program". Regardless of the program type, all computer programs include instructions which, when executed by a processor, cause the processor to perform certain functions. When a computer program is not being executed, the digital data that represent the instructions (the "instruction data image") are typically stored on a relatively slow non-volatile storage device, such as a magnetic or optical disk. The slow speed of the storage would create a substantial bottleneck if the instructions were read directly from the storage during execution of the computer program.

To avoid such a bottleneck, the instruction data image is typically copied into a relatively fast volatile storage, such as random access memory, prior to execution of the program. The processor reads the instructions directly from the copy of the instruction data image that is contained in the faster storage, thereby avoiding the need to constantly access the slower storage.

As the functions performed by computers become more complex, the size of the instruction data image increases. Consequently, the amount of fast memory required to store an entire copy of the instruction data image during program execution also increases. Because fast memory is relatively expensive, techniques have been developed for reducing the amount of fast memory required to efficiently execute a program.

According to one technique, a portion of the slower storage is combined with the faster storage to provide a "virtual memory" that is larger than the available amount of fast storage. During execution of a program, the instruction data image of the program is stored in the virtual memory. Typically, this means that at any given time, some portions of the instruction data image are stored in the slow storage while other portions of the instruction data image are stored in the fast storage. The portions of the instruction data image that are stored in the fast storage are referred to herein as the "loaded portion" of the computer program. To avoid wasting fast storage, it is preferable to limit the loaded portion of a computer program to only those portions of the instruction data image that are required to perform the current high-level operation.

Typically, instructions must be loaded into the fast storage before they can be executed. Therefore, prior to executing an instruction, the portion of the instruction data image that represents the instruction must be part of the loaded portion. If the instruction data image that represents the instruction is not already stored in the fast storage, then it is copied from the slow storage into the fast storage. If there is not enough unused space in the fast storage, then a portion of the fast storage must be freed to receive the required instruction data image. The process of freeing up a portion of fast storage may involve copying modified data from the fast storage to the slow storage. Each time data is transferred between the slow storage and the fast storage, the execution of the computer program is delayed.

Techniques have been developed to minimize the number of data transfers that take place between the slow and fast portions of virtual memory. Specifically, it has been recognized that instructions that cause a processor to perform low-level operations are typically located near each other in the instruction data image. Thus, when one instruction is executed, it is likely that other instructions in the vicinity of the instruction will have to be executed in the near future. Consequently, most virtual memory systems move instructions between the slow and fast storage portions of virtual memory on a block by block basis, rather than instruction by instruction.

By forcing the instructions that correspond to higher level operations to be grouped together in the same code block, both the number of data transfers between the slow and fast portions of virtual memory and the size of the loaded portion may be reduced. For example, consider a discrete high level operation O that requires the execution of functions X, Y and Z. If the instructions to perform functions X, Y and Z are located in the same code block, then the minimum loaded portion would consist of a single block. In addition, a maximum of one code block transfer would take place prior to the performance of operation O. However, if the instruction sequences to perform functions X, Y and Z were each stored in separate code blocks, then the minimum loaded portion during the performance of operation O would include three blocks. In addition, up to three code block transfers may be required to load the loaded portion. Even more code block transfers may be required if the instructions for function X are distributed among many code blocks, the instructions for function Y are distributed among many code blocks, and the instructions for function Z are distributed among many code blocks.

Based on the foregoing, it is desirable to provide a method and apparatus for reducing the size of the minimum loaded portion. Further, it is desirable to provide a method for reducing the number of code block transfers that are performed during the execution of a computer program in a virtual memory environment. It is further desirable to provide a method and apparatus for organizing sections of the instruction data image of a computer program into groups that have a relatively high correlation to discrete, high level operations.

SUMMARY OF THE INVENTION

A method and system for reordering code sections of a computer program are provided. The computer program is executed during an experimental execution period. During the execution period, an access record is made. The access record indicates when each code section is accessed. After the execution period, the code sections are reordered based on when the code sections were accessed during the execution period.

According to one aspect of the invention, the execution period is divided into time intervals. Each time interval corresponds to the time period in which a discrete high level operation of the computer program was performed. An access matrix is created where each row corresponds to a code section, and each column corresponds to a time interval. Values are stored in each cell of the data matrix based on whether the corresponding code section was accessed during the corresponding time interval. The code sections are then reordered based on the values in the rows to which they correspond.

According to another aspect of the invention, each cell in the access matrix stores a single bit. Consequently, each code section has a corresponding bit array. Code sections may be reordered based on the numerical order of the number represented by their corresponding bit arrays. Alternatively, code sections may be reordered so as to allow the least degree of deviation between the bit arrays of successive code sections.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for ordering code sections in a computer program is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
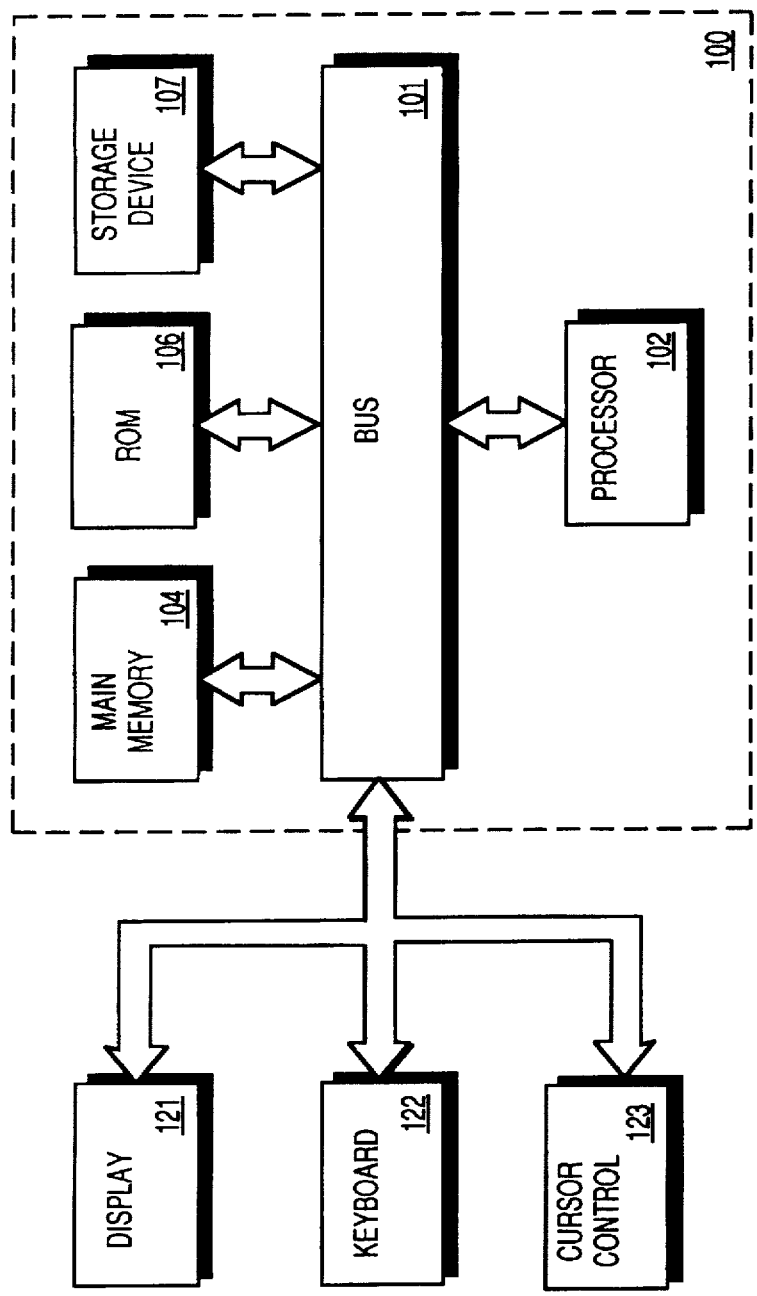
FIG. 1 is a block diagram of a computer system upon which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

According to an embodiment of the present invention, computer system 100 is configured to determine an order for code sections of a computer program. The order causes code sections that implement high-level operations to be grouped together. Consequently, the number of blocks in the minimum loaded portion is reduced. In addition, the amount of code block transfers that occur when the computer program is executed in a system with virtual memory is reduced.

Figure 2:
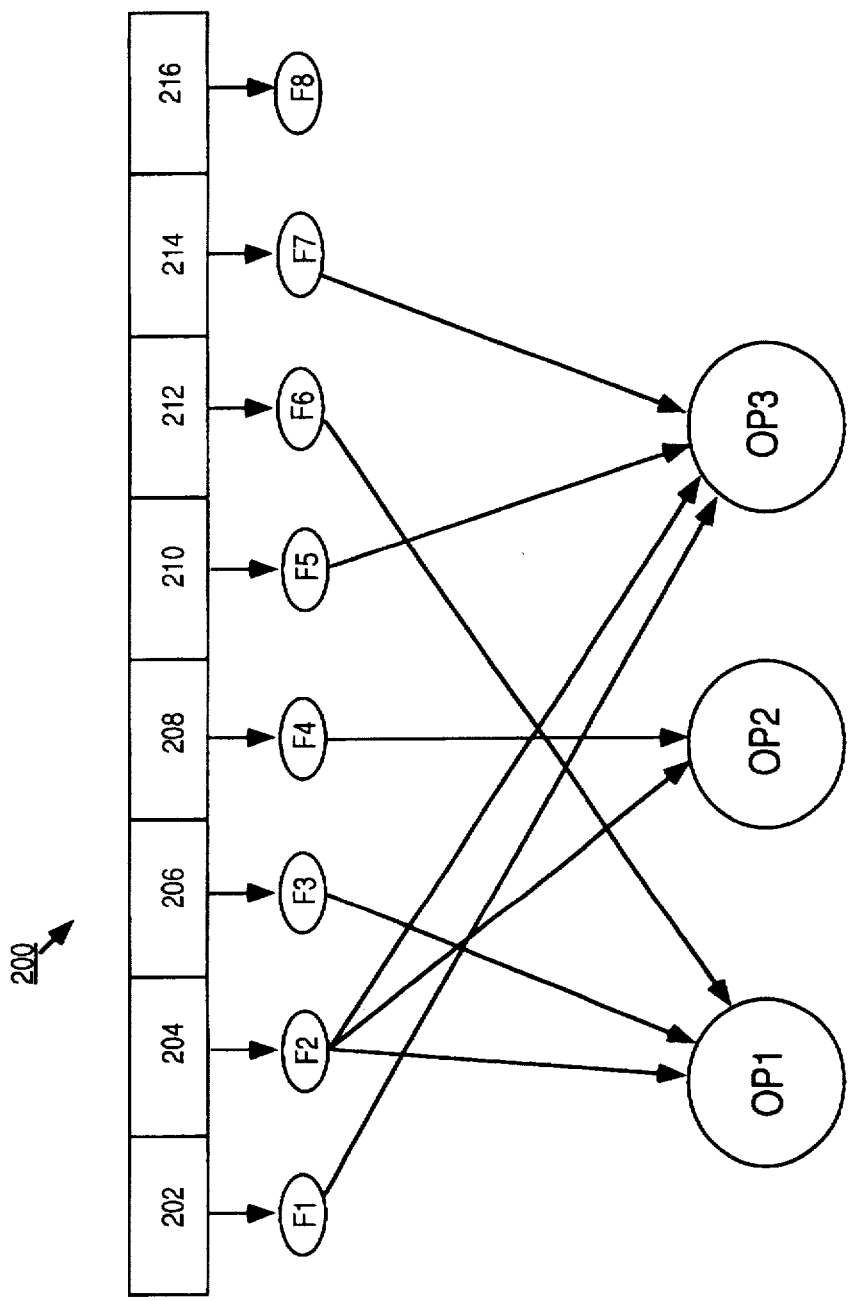
FIG. 2 illustrates the various code sections of an exemplary computer program.

Referring to FIG. 2, it illustrates the instruction data image 200 of an exemplary computer program P. When the computer program P is not being executed, the instruction data image 200 is typically stored on slow storage, such as disk 107. When the computer program P is executed, some or all of the instruction data image 200 is loaded into a fast storage, such as memory 104.

Instruction data image 200 contains code sections 202, 204, 206, 208, 210, 212, 214 and 216. For the purposes of explanation, it shall be assumed that code sections 202, 204, 206, 208, 210, 212, 214 and 216 implement functions F1, F2, F3, F4, F5, F6, F7 and F8 respectively. It shall also be assumed that the computer program P performs three discrete high level operations: OP1, OP2 and OP3. As used herein, the term "discrete operation" refers to an operation which, once invoked, carries through to completion unless interrupted. These operations may be, for example, a program initialization operation, a calculation operation and a program termination operation. It shall also be assumed that operation OP1 requires the performance of functions F2, F3 and F6, operation OP2 requires the performance of functions F2 and F4, and operation OP3 requires the performance of functions F1, F2, F5 and F7. In this scenario, the function F8 is not required by any of the operations performed by the computer program P. Therefore, the code section 216 that contains the instructions to perform function F8 is never accessed.

MONITORED EXECUTION OF PROGRAM

According to an embodiment of the present invention, the computer program P is executed on computer system 100. Specifically, a user enters user input to cause computer system 100 to begin execution of the computer program P. According to the assumptions stated above, the program initialization operation OP1 will be executed in response to the user input.

Figure 3:
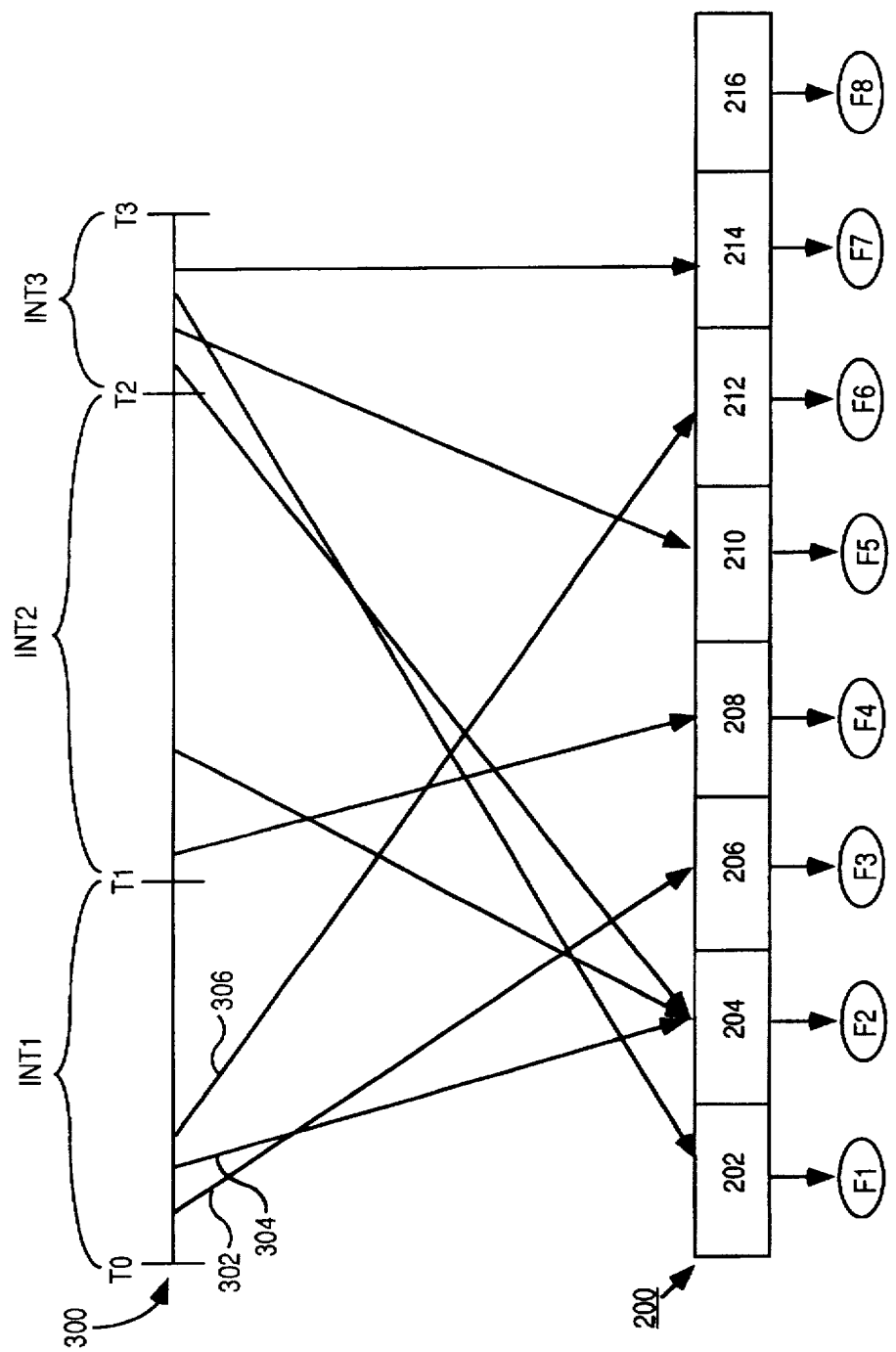
FIG. 3 shows a timeline that illustrates when the various code sections of the computer program illustrated in FIG. 2 were accessed during an execution period.

Referring to FIG. 3, it illustrates a timeline 300 of the events which occur during the time period in which processor 102 is executing the computer program P. Time T0 represents the time at which the user enters the input to invoke the computer program P. In response to the user input, processor 102 performs operation OP1. During the performance of OP1, processor 102 performs functions F3, F2 and F6 by reading and executing instructions contained in code sections 206, 204 and 212, as indicated by lines 302, 304 and 306, respectively.

FIG. 3 represents accesses to each of code sections 206, 204 and 212 by a single line. It should be understood, however, that the performance of a single function may require hundreds of accesses to a particular code section. In general, the first access of a code section will cause the code block containing the code section to be loaded into fast storage. Subsequent accesses to the same code section during the same discrete high level operation will occur with such rapidity that the code block containing the code section will not be transferred out of fast memory while the high level operation is being performed. Therefore, the number of times that a particular code section is accessed during the performance of a discrete high level operation has little effect on the minimum size of the loaded portion and the number of block transfers that have to be performed during the execution of the high level operation.

During the execution of the computer program P, computer system 100 detects and records which code sections of instruction data image 200 are accessed by processor 102 and the time at which they are accessed. This data is referred to hereafter as the "access record". Computer system 100 may store the access record on any storage device, such as disk 107 or memory 104. Optionally, computer system 100 also detects and records when input is entered by the user.

The initialization operation OP1 is completed when processor 102 completes the performance of function F6. Upon the completion of operation OP1, computer system 100 suspends execution of the computer program P until the user indicates which operation to perform next. While execution of the computer program P is suspended, processor 102 may be performing other operations related to other computer programs and/or repeatedly polling input devices to detect user input.

For the purposes of explanation, it shall be assumed that at time T1 the user enters input to invoke operation OP2. Computer system 100 detects and records the time associated with this user input. Processor 102 performs operation OP2 in response to the detected user input. During the performance of operation OP2, processor 102 reads and executes instructions contained in code section 208 to perform function F4, and reads and executes instructions contained in code section 204 to perform function F2. Computer system 100 detects and records in the access record the time when each of these code sections is accessed. Operation OP2 is completed when processor 102 completes the performance of function F2. Upon the completion of operation OP2, computer system waits for user input to determine what operation to perform next.

At time T2, the user enters input to terminate the computer program P. Computer system 100 detects and records the time of this user input. In response to the user input, processor 102 performs operation OP3. During the performance of operation OP3, processor 102 reads and executes instructions from code section 204 to perform function F2, reads and executes instructions from code section 210 to perform function F5, reads and executes instructions from code section 202 to perform function F1 and reads and executes instructions from code section 214 to perform function F7. Computer system 100 detects and records in the access record the timing of each of these code section accesses. At time T3, execution of the computer program P associated with instruction data image 200 ends.

ACCESS DETECTION

During the monitored program execution process described above, computer system 100 detects and records when specific code sections are accessed. Many techniques may be used to perform this access detection. According to one embodiment of the invention, a sequence of instructions is placed in each code section. The sequence of instructions causes processor 102 to record data that identifies the code section in which the sequence resides and the current time. For example, a sequence of instructions may be embedded in code section 202 which, when executed, causes processor 102 to record data that identifies function F1 and the current time. Similarly, a sequence of instructions may be embedded in code section 204 which, when executed, causes processor 102 to record data that identifies function F2 and the current time.

In an alternative embodiment, computer system 100 is configured to execute a detection program simultaneous with the execution of the computer program P. The detection program causes computer system 100 to detect and record when processor 102 is accessing the various code sections of computer program P. In yet another embodiment, monitoring hardware is added to computer system 100 to detect and record calls made by processor 102 during the execution of the computer program P.

ACCESS MATRIX CONSTRUCTION

When the execution of the computer program P ends, computer system 100 constructs within memory 104 an access matrix based on the information that was stored during the execution of the computer program P.

Initially, computer system 100 divides the time period between T0 and T3 (the "execution period") into time intervals. Various methods may be used to determine the size, number, and boundaries of the time intervals into which the execution period is divided. For example, the execution period may be divided into time intervals having a predetermined duration. Alternatively, the execution period may be divided up into a predetermined number of time intervals of equal duration. The execution period may also be divided up into time intervals of variable duration based on factors such as the density and distribution of function calls and/or the timing of user input during the execution period. The present invention is not limited to any particular technique for dividing the execution period into intervals. However, the selected time intervals are preferably short enough to ensure a low average paging rate within each time interval.

In the present example, computer system 100 divides the execution period into time intervals based on the timing of user input during the execution period. Specifically, the execution period is divided into three time intervals: INT1, INT2 and INT3. Interval INT1 covers the time between the input which invoked the program P and the input that invoked operation OP2. Interval INT2 covers the time between the input which invoked operation OP2 and the input which invoked operation OP3. Interval INT3 covers the time between the input which invoked operation OP3 and the termination of the computer program P.

Figure 4:
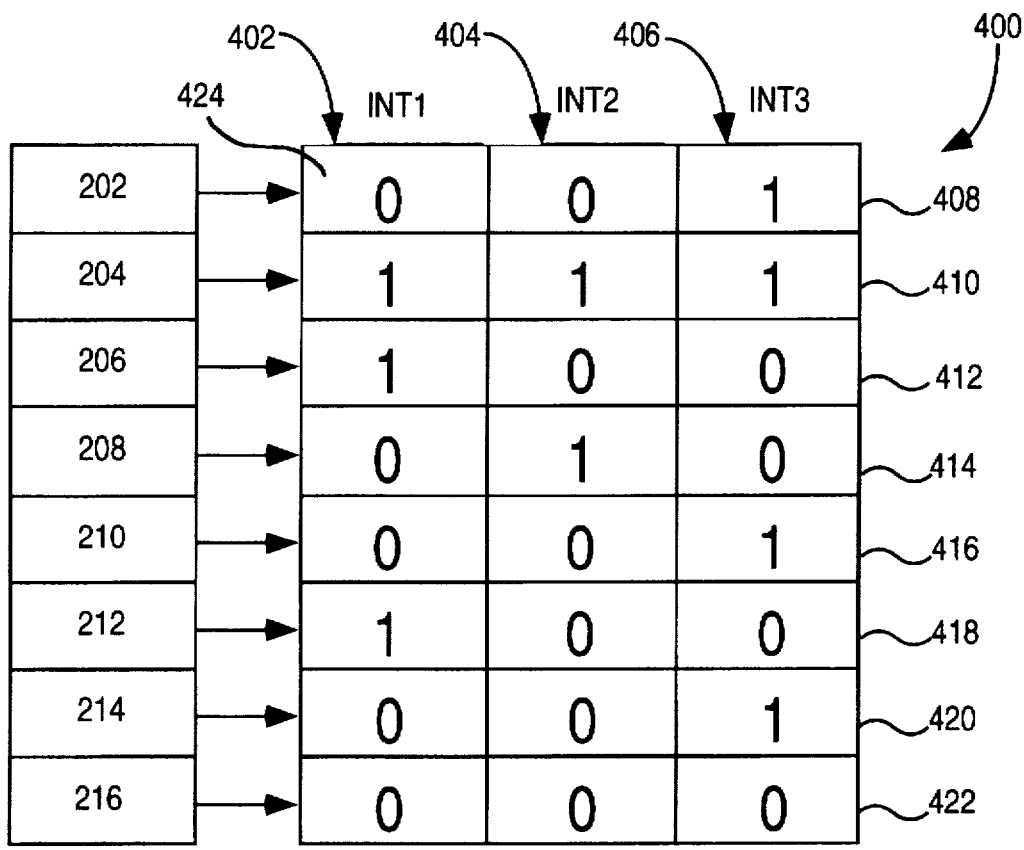
FIG. 4 illustrates an access matrix that has been constructed based on the accesses recorded during the execution period shown in FIG. 2.

When the various time intervals have been determined, computer system 100 constructs a matrix where each row corresponds to a code section in instruction data image 200 and each column corresponds to one of the time intervals. The matrix may be constructed, for example, in memory 104. FIG. 4 illustrates an access matrix 400 that has three columns 402, 404 and 406 that correspond to time intervals INT1, INT2 and INT3, respectively, and eight rows 408, 410, 412, 414, 416, 418, 420 and 422 that correspond to code sections 202, 204, 206, 208, 210, 212, 214 and 216, respectively.

Computer system 100 fills in the matrix 400 with values based on the access record that was created during the execution period. According to one embodiment, each cell in access matrix 400 stores one bit. For each cell, the bit is set if and only if the code section that corresponds to the row in which the cell resides was accessed during the time interval that corresponds to the column in which the cell resides. For example, cell 424 resides in the row 408 that corresponds to code section 202, and in the column 402 that corresponds to interval INT1. Consequently, the bit stored in cell 424 is set if and only if code section 202 was accessed during interval INT1. In the example given above, code section 202 was not accessed during interval INT1, so cell 424 stores a "0".

When computer system 100 has completely filled in access matrix 400 based on the access data stored during the execution period, each row will store a binary array associated with a particular code section. For example, row 408, which corresponds to code section 202, stores the binary array "001". Computer system 100 then determines an order for the various code sections based on the binary array associated with the code sections.

ORDER DETERMINATION

Various techniques may be used to determine an order for the code sections based on the binary arrays that correspond to the code sections. For example, a number may be assigned to each code section based on the value of the binary number represented by the binary array associated with the code section. Applying this ordering technique to the present example, code section 202 would be assigned the number "1" because its binary array "001" is a binary representation of "1". Code section 204 would be assigned the number "7" which is represented by the binary array "111" that corresponds to code section 204. Code sections 206, 208, 210, 212, 214 and 216 would be assigned the numbers 4, 2, 1, 4, 1 and 0 respectively.

Once each code section has been assigned a number, computer system 100 determines the order for the code sections based on the numerical order of the numbers assigned to the code sections. Thus, code section 204, which has been assigned the number "7", would be followed by code sections 206 and 212, which have been assigned the number "4". Code sections 206 and 212 would be followed by code section 208, which has been assigned the number "2", and then by code sections 202, 210 and 214 which have all been assigned the number "1". Code section 216, which has been assigned the number "0", would be the last in the order.

In the present example, numerous code sections have identical binary arrays. For example, code sections 202, 210 and 214 are all associated with the binary array "001". Consequently, something other than the binary array must be used to determine how these code sections are ordered with respect to each other. According to one embodiment, the order among code sections with identical binary arrays may simply be random. According to an alternative embodiment, code sections with identical binary arrays may be ordered based on the order in which they are accessed during one or more time intervals. For example, code sections 202, 210 and 214 were all accessed during time interval INT3. Of these three code sections, code section 210 was accessed first, code section 202 was accessed second and code section 214 was accessed third. This access order may therefore be reflected in the code section order.

Figure 5:
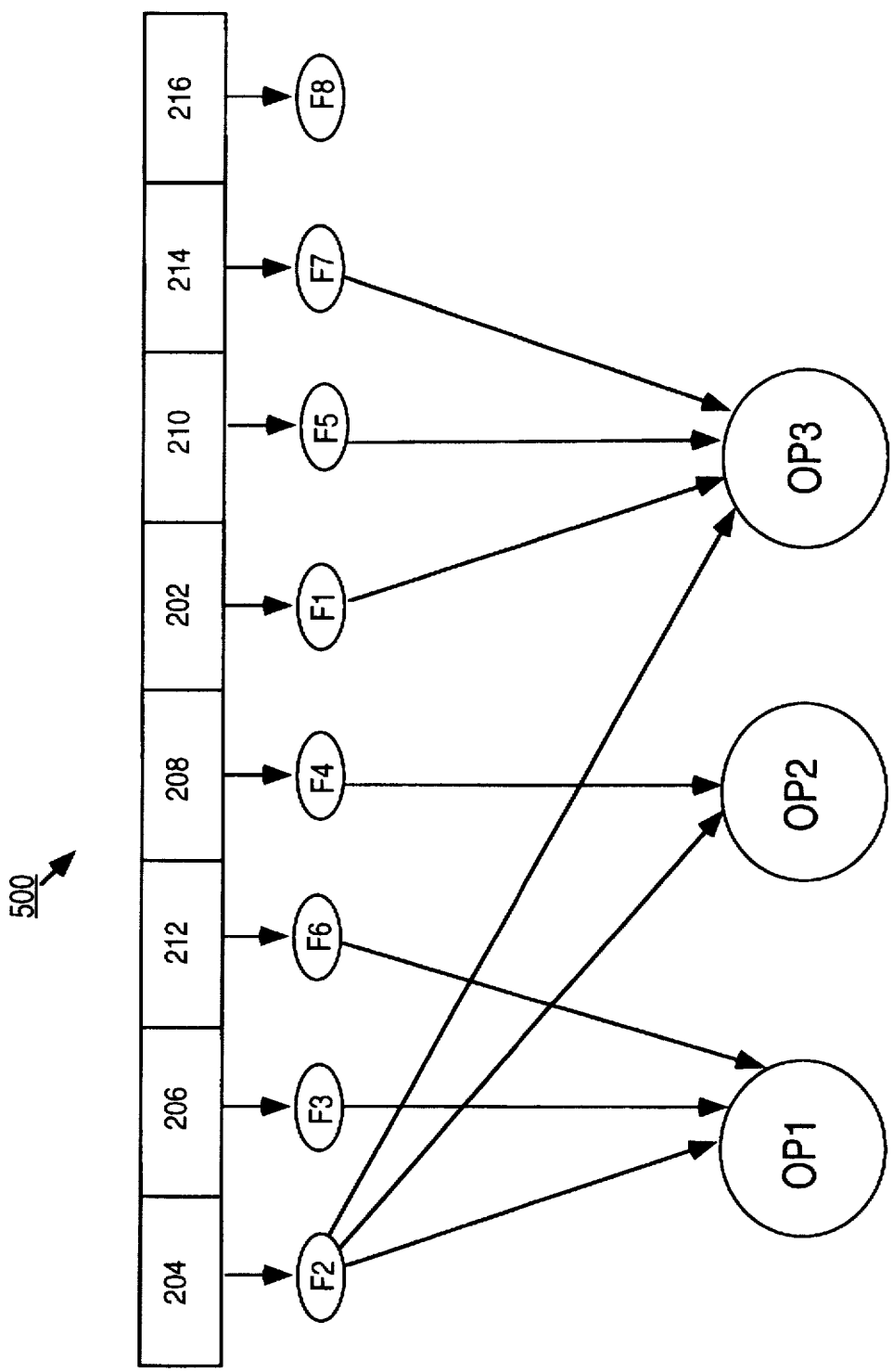
FIG. 5 illustrates a new instruction data image in which the code sections of the computer program illustrated in FIG. 2 have been reordered according to an embodiment of the invention.

FIG. 5 illustrates an instruction data image 500 that has been constructed by reordering the code sections of instruction data image 200 according to the order determined by the process described above. It should be noted that there is a stronger correlation between the location of the code sections in instruction data image 500 and the operations that use the code sections than there is between the location of the code sections in instruction data image 200 and the operations that use the code sections. This stronger correlation results in a significant performance increase when the computer program P represented by the instruction data image is executed in a virtual memory system.

For example, assume that each of the code sections 202, 204, 206, 208, 210, 212, 214 and 216 has a size of 1K bytes. Assume also that the computer program P is executed on a virtual memory system that performs transfers between the slow and fast portions of virtual memory in 4K blocks. Under these conditions, the eight code sections would be distributed over two 4K blocks. If the code sections 202, 204, 206, 208, 210, 212, 214 and 216 are ordered as shown in instruction data image 200, then the first block (BLOCK1) would include code sections 202, 204, 206 and 208, and the second block (BLOCK2) would include code sections 210, 212, 214 and 216. If the code sections 202, 204, 206, 208, 210, 212, 214 and 216 are ordered as shown in instruction data image 500, then the first block (BLOCKA) would include code sections 204, 206, 212 and 208, and the second block (BLOCKB) would include code sections 202, 210, 210, 214 and 216.

Based on the foregoing, if the code sections are ordered as shown in instruction data image 200, the performance of operation OP1 would require the loading of two 4K blocks (BLOCK1 and BLOCK2), the performance of operation OP2 would require the loading of one 4K block (BLOCK 1) and the performance of operation OP3 would require the loading of two 4K blocks (BLOCK1 and BLOCK2). In contrast, if the code sections are ordered as shown in instruction data image 500, only one block (BLOCKA) would have to be loaded to perform operation OP1, one block (BLOCKA) would have to be loaded to perform operation OP2, and two blocks (BLOCKA and BLOCKB) would have to be loaded to perform operation OP3. In this context, a code section is "loaded" by copying it from the slow storage portion of virtual memory to the fast storage portion of virtual memory if it is not already present in the fast storage portion of virtual memory.

The fact that one less block needs to be loaded during the initialization operation OP1 when the code sections are ordered as shown in instruction data image 500 may lead to significant efficiency gains. For example, consider the extra operations that a two block initialization operation OP1 may require. If the fast portion of virtual memory is already crowded, then a block of data may have to be written to the slow storage portion of virtual memory to provide room for BLOCK2. Once OP1 has been completed, BLOCK2 will just take up valuable space in fast storage until it is deallocated or the computer program P is terminated.

A simple example has been selected to clearly describe the present invention. However, most computer programs are significantly more complex than the exemplary computer program P. In practice, many computer programs perform hundreds of discrete, high-level operations and thousands of functions. In such complex conditions, even greater efficiency gains may be realized by ordering code sections according to the present invention. For example, the code sections that perform a complex operation may be distributed over ten 4K data blocks prior to reordering the code sections. Reordering may consolidate the code sections in a single 4K data block. Thus, one tenth as many data blocks must be loaded into fast storage to perform the operation.

ORDER DETERMINATION BASED ON SIMILARITY OF BIT PATTERNS

The ordering technique described above is merely one of many possible methods for ordering the code sections based on the access record. According to an alternate embodiment of the invention, the access matrix 400 is constructed as described above, but the code sections are reordered so that the least number of bits are changed between the bit arrays of successive code sections.

To arrive at such an order, a first code section is selected and placed first in the new code section order. The bit array corresponding to the first code section becomes the "current bit array". The current bit array is compared to the bit arrays of the other code sections to determine the bit array with the least degree of deviation from the current bit array. In this context, the degree of deviation between two binary arrays is determined by how many corresponding bit values in the two binary arrays are different. For example, the three bits in the binary array "001" of code section 202 are identical to the three bits of binary array "001" of code section 210. Consequently, the degree of deviation between the two binary arrays is zero. In contrast, only the second bit of the binary array "001" of code section 202 matches the corresponding bit in the binary array "100" of code section 206. Thus, the degree of deviation between the binary arrays of codes sections 202 and 206 is two. The degree of deviation may be derived by counting the number of bits set in the exclusive OR of the two bit arrays.

Once the binary array with the least degree of deviation with the current binary array has been determined, it becomes the current binary array, and the code section associated with it is placed second in the new order of code sections. The new current binary array is then compared with binary arrays of all of the code sections that have not yet been placed in the new code section order. The binary array that has the least degree of deviation from the current binary array becomes the new current array, and the code section associated with it is placed third in the new code section order. This process is repeated until all of the code sections have been placed into the new code section order.

Applying this reordering technique to the present example, it shall be assumed that code section 204, which has the numerically highest binary array, is selected as the first code section in the new code section order. Other criteria may be used to select the first code section. For example, the first code section may be randomly selected, selected to be the first code section to execute at program start-up, or selected to be the numerically lowest binary array. The present invention is not limited to any particular selection criteria.

Having selected code section 204 as the first code section in the new code section order, the binary array "111" associated with code section 204 becomes the current binary array. The current binary array is compared with the other binary arrays to determine the degree of deviation between it and each of the other binary arrays. The code section that is associated with the binary array with the least degree of deviation from the current binary array is selected as the next array in the new code section order. The degree of deviation between "111" and all of the other arrays is two, with the exception of the array "000" associated with code section 216, whose degree of deviation is three.

Only one code section can immediately follow code section 202 in the new code section order. Therefore, some criteria must be employed to resolve "ties" between binary arrays that have equal degrees of deviation. One technique to resolve ties would be to randomly select one of code sections involved in the tie. However, better results may be achieved by selecting, among the code sections involved in the tie, the code section that was accessed first during the execution period. In the present example, code section 206 was the first code section to be accessed in the execution period. Therefore, code section 206 is selected to be the second code section in the new code section order.

Having selected code section 206 to be the next code section in the code section order, the binary array "100" associated with code section 206 becomes the current binary array. The current binary array is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

In the present example, the binary array "100" associated with code section 212 is identical to the current binary array. Therefore, code section 212 is selected as the next code section in the new code section order. Consequently, the binary array "100" associated with code section 212 becomes the current binary array.

The current binary array "100" is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

In the present example, the binary array "000" associated with code section 216 has the least degree of deviation from the current binary array. Therefore, code section 216 is selected as the next code section in the new code section order. Consequently, the binary array "000" associated with code section 216 becomes the current binary array.

The current binary array "000" is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

In the present example, the binary arrays associated with code sections 202, 208, 210 and 214 all have the same degree of deviation from the current binary array. Of these code sections, code section 208 was the first code section to be accessed during the execution period. Therefore, code section 208 is selected as the next code section in the new code section order. Consequently, the binary array "010" associated with code section 208 becomes the current binary array.

The current binary array "010" is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

In the present example, the binary arrays associated with code sections 202, 210 and 214 all have the same degree of deviation from the current binary array. Of these code sections, code section 210 was the first code section to be accessed during the execution period. Therefore, code section 210 is selected as the next code section in the new code section order. Consequently, the binary array "001" associated with code section 210 becomes the current binary array.

The current binary array "001" is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

In the present example, the binary arrays associated with code sections 202 and 214 are identical to the current binary array. Of these code sections, code section 202 was the first code section to be accessed during the execution period. Therefore, code section 202 is selected as the next code section in the new code section order. Consequently, the binary array "001" associated with code section 202 becomes the current binary array.

The current binary array "001" is compared with the binary arrays of all of the code sections that have not yet been placed in the new code section order to determine the degree of deviation between it and the other binary arrays. The code section that is associated with the binary array with the least degree of deviation from the current binary array is selected as the next array in the new code section order.

At this point, code section 214 is the only code section that has not yet been placed in the new code order. Consequently, code section 214 is selected as the next code section in the new code section order. Having placed all of the code sections in the new code section order, the reordering process is complete.

Figure 6:
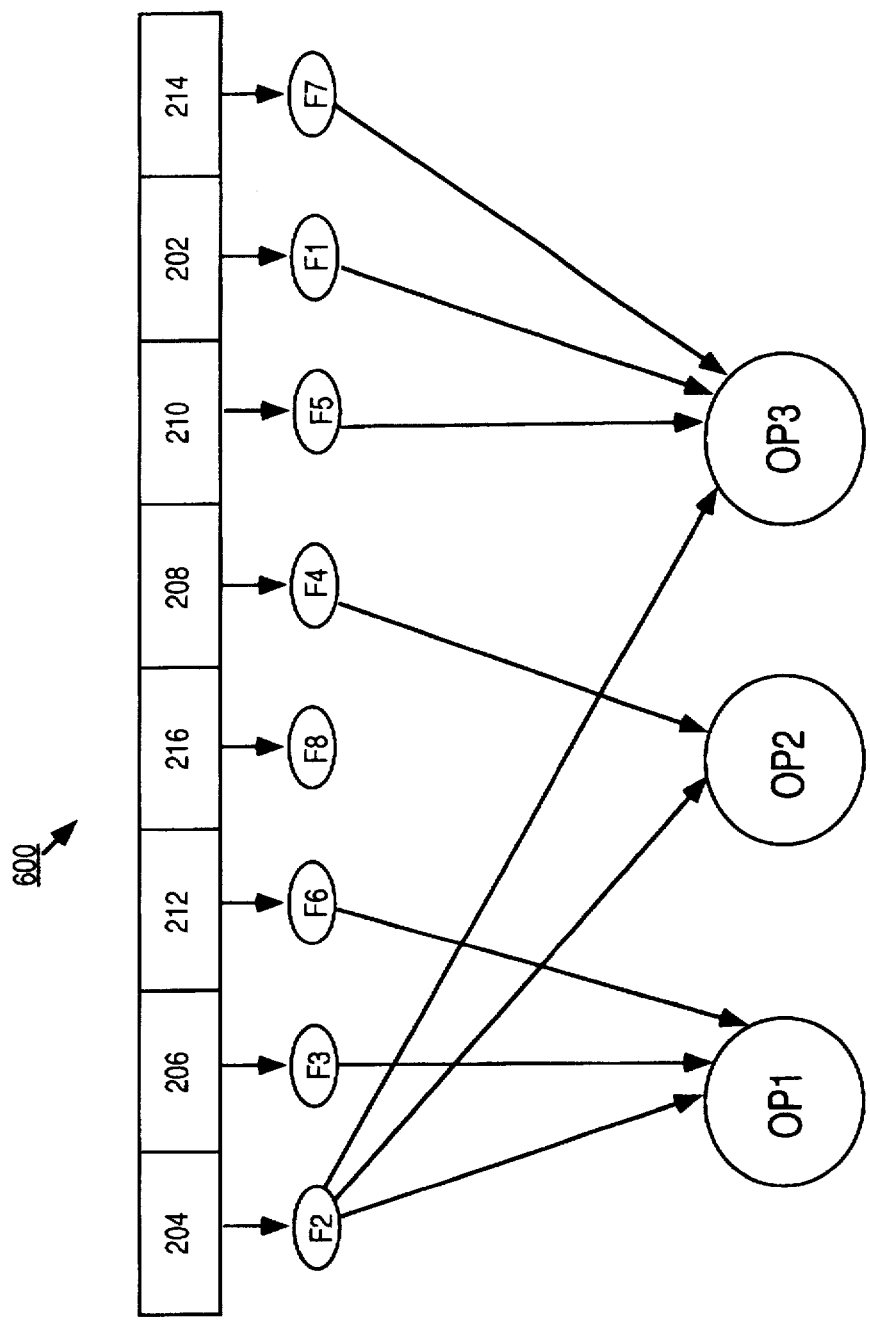
FIG. 6 illustrates a new instruction data image in which the code sections of the computer program illustrated in FIG. 2 have been reordered according to an embodiment of the invention.

FIG. 6 illustrates instruction data image 600 for computer program P in which the code sections have been reordered according to results of the "least-degree-of-deviation" reordering process described above. Similar to the instruction data image 500, the order of the code sections in instruction data image 600 has a stronger correlation to the high-level operations performed by computer program P than does the order of the code sections in the original instruction data image 200.

Two techniques for ordering code sections based on when the code sections are accessed during an execution period have been described in detail above. However, the described techniques are merely exemplary. Various other techniques may be used. For example, the code sections may be ordered to reflect the order in which the code sections are first accessed during the execution period. Applying this technique to the present example, the code sections would be reordered in the following sequence: code section 206, code section 204, code section 212, code section 208, code section 210, code section 202, code section 214 and finally code section 216. Note that this order may be readily determined from the access record and does not require the construction of an access matrix.

REORDERING THE INSTRUCTION DATA IMAGE

Once a new order for the code sections of a computer program has been determined, a new instruction data image is constructed in which the code sections are rearranged to reflect the new code section order. According to one embodiment of the invention, the new instruction data image is created based on a map file. Specifically, a map file is created which designates the link order for the object code files that correspond to each of functions F1, F2, F3, F4, F5, F6, F7 and F8. The link order designated for each of the functions is based on the order that has been determined for the code sections that correspond to the functions. Thus, to construct the instruction data image illustrated in FIG. 6, the map file specifies that the object code files should be linked according to the order F2, F3, F6, F8, F4, F5, F1 and F7. This map file is read by a linker program executing on processor 102. Based on the map file, the linker program causes processor 102 to link the various object code modules associated with functions F1, F2, F3, F4, F5, F6, F7 and F8 to construct the instruction data image 600 shown in FIG. 6.

Other techniques may be used to construct instruction data images in which the code sections are reordered based on the a code section order determined according to the present invention. For example, a compiler may be constructed to read a compiler map file. The compiler map file would designate the order in which object code is generated for functions or portions of functions. Alternatively, a mechanism may be constructed which simply rearranges sections of an existing instruction data image to form a new instruction data image. For example, processor 102 can be programmed to extract code sections from instruction data image 200 and store the code sections in a new order to produce instruction data image 600. This rearrangement process may require some of the address references within the various code sections to be modified to reflect the new location of the code which they reference.

In the preceding discussion, re-ordering techniques have been described with specific reference to code sections. However, the present invention is not limited to re-ordering code sections. Specifically, rather than re-ordering the code of a program, the techniques described above may be used to re-order data that is accessed during the execution of a computer program. For example, a database program may access some sections of data at different times and frequencies than other sections of data. These data accesses are more efficient when sections of data are stored in the same order that they are accessed. To apply the re-ordering techniques to data, the database program would be executed during an execution period. Data accesses made by the database program during the execution period would be detected and recorded. The recorded access information would be used to re-order the data according to the re-ordering techniques described above.

Programmed "objects" are sets of related functions and data. Just as the above-described techniques can be used to re-order sections that are all-code or all-data, the techniques can be used to re-order objects, which include both code and data.

Two distinct and significant benefits have been obtained through the application of the reordering techniques described herein. First, the code portions for routines that correspond to the same operation are more tightly clustered. Because the code for a given operation is distributed over fewer code sections, the average amount of code that must be resident in fast memory during the performance any given operation is reduced. Consequently, the same operation may be performed while using a smaller amount of fast memory. This allows systems with less fast memory to execute re-ordered code at the same level of efficiency as systems with more fast memory can execute code that has not been re-ordered. In addition, more fast memory becomes available for other concurrently-executing operations.

The second benefit is that the average number of page faults that occur when loading the code sections required to perform an operation is significantly reduced. The number of page faults is reduced because the code sections are aligned in the order that they are used. Thus, code sections that are used together and loaded together are stored together.

While specific embodiments of the present invention have been described, various modifications and substitutions will become apparent by this disclosure. Such modifications and substitutions are within the scope of the present invention, and are intended to be covered by the following claims.

What is claimed is:

1. A method executable in a computer system for ordering code sections of a computer program, wherein the computer program includes a plurality of code sections, the method comprising the steps of:

executing the computer program during an execution period;

dividing said execution period into a plurality of time intervals;

detecting when each of said plurality of code sections is used during a time interval of said plurality of time intervals; and ordering said code sections based on a value assigned to said code sections, wherein said value is dependent upon a frequency of said code sections detected and said time interval of said plurality of time intervals.

2. The method of claim 1 wherein:

each of said code sections implements a function; and said step of detecting when each of said plurality of code sections is used comprises the step of detecting when a call is made to said function implemented by said code section.

3. The method of claim 1 wherein said step of ordering said code sections comprises:

a) generating a plurality of data arrays for said plurality of code sections by performing the following steps for each code section of said plurality of code sections a1) generating a data array, wherein each cell in said data array corresponds to a time interval of said plurality of time intervals; and a2) storing in each cell in said data array a value that is based on whether the code section associated with said data array was used during the time interval that corresponds to said cell;

b) ordering said code sections based on said plurality of data arrays.

4. The method of claim 3 wherein said step of b) ordering said code sections based on said plurality of data arrays comprises the steps of:

determining a numerical value for each code section, wherein said numerical value for each code section is a number represented by the values stored in the data array that corresponds to said code section; and arranging said plurality of code sections in numerical order based on said numerical value determined for each code section.

5. The method of claim 3, wherein said step of b) ordering said code sections based on said plurality of data arrays comprises the steps of:

b1) selecting a selected code section of said plurality of code sections;

b2) assigning said selected code section a particular position in a new code section order;

b3) establishing the data array that corresponds to said selected code section as a current data array;

b4) performing a comparison between the current data array and data arrays that correspond to code sections which have not yet been assigned a position in said new code section order;

b5) selecting, based on said comparison, a next code section from said code sections which have not yet been assigned a position in said new code section order;

b6) assigning said next code section to a next position in said new code section order;

b7) establishing the data array associated with said next code section as said current data array; and b8) repeating steps b4) through b7) until each code section of said plurality of code sections has been assigned a position in said new code section order.

6. The method of claim 5 wherein said step of selecting, based on said comparison, a next code section from said code sections which have not yet been assigned a position in said new code section order comprises the step of selecting as said next code section the code section that corresponds to the data array that is a least degree of deviation from said current data array.

7. The method of claim 6 further comprising the step of:

if two or more data arrays have said least degree of deviation from said current data array, then selecting as said next code section the code section that i) corresponds to a data array of said two or more data arrays; and ii) was accessed during said execution period before any other of said code sections that correspond to one of said two or more data arrays.

8. The method of claim 5 wherein each cell in said plurality of data arrays hold a single bit value.

9. The method of claim 8 wherein said step of performing a comparison between the current data array and data arrays that correspond to code sections which have not yet been assigned a position in said new code section order.

10. The method of claim 1 wherein said step of dividing said execution period into time intervals comprises the steps of:

detecting user input during said execution period, and dividing said execution period into time intervals based on when said user input occurs within said execution period.

11. A computer system comprising:

a memory storing a plurality of code sections of a computer program;

a processor coupled to said memory, said processor accessing said plurality of code sections during an execution period to execute said computer program during said execution period, said processor dividing said execution period into a plurality of time intervals, said processor storing in said memory an access record that indicates when specific code sections of said plurality of code sections were accessed by said processor during said plurality of time intervals; and a mechanism configured to order said plurality of code sections based on said access record, said mechanism includes said processor configured to execute a sequence of instructions stored in said memory, said sequence of instructions including instructions which, when executed by said processor, cause said processor to read said access record and ordering said code sections based on a value assigned to said code sections, wherein said value is dependent upon a frequency of said code sections in said access record and each of said plurality of time intervals in which each of said code sections was accessed by said processor.

12. The computer system of claim 11 wherein said sequence of instructions includes instructions which, when executed by said processor, cause said processor to perform the steps of:

a) generating a plurality of data arrays for said plurality of code sections by performing the following steps for each code section of said plurality of code sections
  a1) generating a data array, wherein each cell in said data array corresponds to a time interval of said plurality of time intervals; and
  a2) storing in each cell in said data array a value that is based on whether the code section associated with said data array was used during the time interval that corresponds to said cell;
b) ordering said code sections based on said plurality of data arrays.

13. The computer system of claim 12 wherein said step of b) ordering said code sections based on said plurality of data arrays comprises the steps of:

determining a numerical value for each code section, wherein said numerical value for each code section is a number represented by the values stored in the data array that corresponds to said code section; and arranging said plurality of code sections in numerical order based on said numerical value determined for each code section.

14. The computer system of claim 12 wherein said step of b) ordering said code sections based on said plurality of data arrays comprises the steps of:

b1) selecting a selected code section of said plurality of code sections;
b2) assigning said selected code section a particular position in a new code section order;
b3) establishing the data array that corresponds to said s elected code section as a current data array;
b4) performing a comparison between the current data array and data arrays that correspond to code sections which have not yet been assigned a position in said new code section order;
b5) selecting, based on said comparison, a next code section from said code sections which have not yet been assigned a position in said new code section order;
b6) assigning said next code section to a next position in said new code section order;
b7) establishing the data array associated with said next code section as said current data array; and
b8) repeating steps b4) through b7) until each code section of said plurality of code sections has been assigned a position in said new code section order.

15. The computer system of claim 11 wherein said mechanism orders said plurality of code sections according to the order in which said code sections were first accessed during said execution period.

16. The computer system of claim 11 wherein said memory includes a nonvolatile storage medium and a volatile storage medium, said nonvolatile storage medium being relatively slower than said volatile storage medium.

17. The computer system of claim 16 wherein at least one portion of said nonvolatile storage medium and at least one portion of said volatile storage medium are used in said computer system to implement a virtual storage space.

18. A computer program product comprising:

a computer usable medium having computer readable code embodied therein for ordering code sections of a target computer program, wherein the target computer program includes a plurality of code sections, the computer program product comprising:
  computer readable program code devices configured to cause a computer to detect when each of said plurality of code sections is used during an execution period, the execution period being a time period during which the target computer program is executed;
  computer readable program code devices configured to cause a computer to divide said execution period into a plurality of time intervals; and
  computer readable program code devices configured to cause a computer to order said code sections based on a value assigned to said code sections, wherein said value is dependent upon a frequency of said code sections detected and said time interval of said plurality of time intervals.

19. The computer program product of claim 18 wherein: each of said code sections implements a function; and said computer readable program code devices configured to cause a computer to detect when each of said plurality of code sections is used comprises computer readable program code devices configured to cause a computer to detect when a call is made to said function implemented by said code section.

20. The computer program product of claim 18 wherein said computer readable program code devices configured to cause a computer to order said code sections comprise:

a) computer readable program code devices configured to cause a computer to generate a plurality of data arrays for said plurality of code sections by causing the computer to perform the following steps for each code section of said plurality of code sections
  a1) generating a data array, wherein each cell in said data array corresponds to a time interval of said plurality of time intervals; and
  a2) storing in each cell in said data array a value that is based on whether the code section associated with said data array was used during the time interval that corresponds to said cell;
b) computer readable program code devices configured to cause a computer to order said code sections based on said plurality of data arrays.

21. The computer program product of claim 20 wherein said computer readable program code devices configured to cause a computer to order said code sections based on said plurality of data arrays comprises:

computer readable program code devices configured to cause a computer to determine a numerical value for each code section, wherein said numerical value for each code section is a number represented by the values stored in the data array that corresponds to said code section; and computer readable program code devices configured to cause a computer to arrange said plurality of code sections in numerical order based on said numerical value determined for each code section.

22. The computer program product of claim 20 wherein said computer readable program code devices configured to cause a computer to order said code sections based on said plurality of data arrays comprises computer readable program code devices configured to cause a computer to perform the steps of:

b1) selecting a selected code section of said plurality of code sections;

b2) assigning said selected code section a particular position in a new code section order;

b3) establishing the data array that corresponds to said selected code section as a current data array;

b4) performing a comparison between the current data array and data arrays that correspond to code sections which have not yet been assigned a position in said new code section order;

b5) selecting, based on said comparison, a next code section from said code sections which have not yet been assigned a position in said new code section order;

b6) assigning said next code section to a next position in said new code section order;

b7) establishing the data array associated with said next code section as said current data array; and b8) repeating steps b4) through b7) until each code section of said plurality of code sections has been assigned a position in said new code section order.

23. The computer program product of claim 22 wherein said computer readable program code devices configured to cause a computer to select, based on said comparison, a next code section from said code sections which have not yet been assigned a position in said new code section order comprises computer readable program code devices configured to cause a computer to select as said next code section the code section that corresponds to the data array that a least degree of deviation from said current data array.

24. The computer program product of claim 23 further comprising computer readable program code devices configured to cause a computer to perform the steps of:

if two or more data arrays have said least degree of deviation from said current data array, then selecting as said next code section the code section that
  i) corresponds to a data array of said two or more data arrays; and
  ii) was accessed during said execution period before any other of said code sections that correspond to one of said two or more data arrays.

25. The computer program product of claim 22 wherein each cell in said plurality of data arrays hold a single bit value.

26. The computer program product of claim 25 wherein said computer readable program code devices configured to cause a computer to perform a comparison between the current data array and data arrays that correspond to code sections which have not yet been assigned a position in said new code section order comprises computer readable program code devices configured to cause a computer to perform an exclusive OR function between a bit pattern stored in the current data array and bit patterns stored in data arrays that correspond to code sections which have not yet been assigned a position in said new code section order.

27. The computer program product of claim 18 wherein said computer readable program code devices configured to cause a computer to divide said execution period into time intervals comprises computer readable program code devices configured to cause a computer to perform the steps of:

detecting user input during said execution period, and dividing said execution period into time intervals based on when said user input occurs within said execution period.

28. A method executable on a computer system for ordering data accessed by a computer program, wherein the data includes a plurality of data sections, the method comprising the steps of:

executing the computer program during an execution period;

dividing said execution period into a plurality of time intervals;

detecting when each of said plurality of data sections is accessed by said computer program during said execution period; and ordering said data sections based on a value assigned to said data sections, wherein said value is dependant upon a frequency of said data sections detected and each of said plurality of time intervals in which each of said data sections was accessed by said computer program.

29. The method of claim 28 wherein said step of ordering said data sections comprises:

a) generating a plurality of data arrays for said plurality of data sections by performing the following steps for each data section of said plurality of data sections
  a1) generating a data array, wherein each cell in said data array corresponds to a time interval of said plurality of time intervals; and
  a2) storing in each cell in said data array a value that is based on whether the data section associated with said data array was accessed by said computer program during the time interval that corresponds to said cell;

b) ordering said data sections based on said plurality of data arrays.

30. The method of claim 29 wherein said step of b) ordering said data sections based on said plurality of data arrays comprises the steps of:

determining a numerical value for each data section, wherein said numerical value for each data section is a number represented by the values stored in the data array that corresponds to said data section; and arranging said plurality of data sections in numerical order based on said numerical value determined for each data section.

31. The method of claim 29 wherein said step of b) ordering said data sections based on said plurality of data arrays comprises the steps of:

b1) selecting a selected data section of said plurality of data sections;

b2) assigning said selected data section a particular position in a new data section order;

b3) establishing the data array that corresponds to said selected data section as a current data array;

b4) performing a comparison between the current data array and data arrays that correspond to data sections which have not yet been assigned a position in said new data section order;

b5) selecting, based on said comparison, a next data section from said data sections which have not yet been assigned a position in said new data section order;

b6) assigning said next data section to a next position in said new data section order;

b7) establishing the data array associated with said next data section as said current data array; and b8) repeating steps b4) through b7) until each data section of said plurality of data sections has been assigned a position in said new data section order.

\* \* \* \* \*